United States Patent
Johnson et al.

(10) Patent No.: US 8,261,274 B2
(45) Date of Patent: *Sep. 4, 2012

(54) METHOD AND SYSTEM FOR MANAGING A TASK

(75) Inventors: Darrin P. Johnson, San Jose, CA (US); Eric C. Saxe, Livermore, CA (US)

(73) Assignee: Oracle America, Inc., Redwood City, CA (US)

( * ) Notice: Subject to any disclaimer, the term of this patent is extended or adjusted under 35 U.S.C. 154(b) by 701 days.

This patent is subject to a terminal disclaimer.

(21) Appl. No.: 12/493,943

(22) Filed: Jun. 29, 2009

(65) Prior Publication Data

US 2010/0333097 A1    Dec. 30, 2010

(51) Int. Cl.
*G06F 9/46* (2006.01)

(52) U.S. Cl. ...................................... 718/102

(58) Field of Classification Search .................. None
See application file for complete search history.

(56) References Cited

U.S. PATENT DOCUMENTS

| | | | |
|---|---|---|---|
| 6,493,739 B1* | 12/2002 | Dolin et al. | 718/102 |
| 6,868,413 B1* | 3/2005 | Grindrod et al. | 706/59 |
| 7,401,112 B1* | 7/2008 | Matz et al. | 709/202 |
| 7,454,752 B2* | 11/2008 | Masuoka | 718/102 |
| 7,950,011 B2* | 5/2011 | Mani et al. | 718/102 |
| 8,056,079 B1* | 11/2011 | Martin et al. | 718/102 |
| 2002/0116248 A1* | 8/2002 | Amit et al. | 705/9 |
| 2007/0180089 A1* | 8/2007 | Fok et al. | 709/223 |
| 2009/0070762 A1* | 3/2009 | Franaszek et al. | 718/102 |
| 2009/0276779 A1* | 11/2009 | Kato et al. | 718/102 |

OTHER PUBLICATIONS

Apple Inc., "Technology Brief Grand Central Dispatch A better way to do multicore", Jun. 2009; 6 pages.

* cited by examiner

*Primary Examiner* — Emerson Puente
*Assistant Examiner* — Hiren Patel
(74) *Attorney, Agent, or Firm* — Osha Liang LLP

(57) ABSTRACT

A computer readable storage medium including executable instructions for managing a task. Instructions include receiving a request. Instructions further include determining a task corresponding with the request using a request-to-task mapping. Instructions include obtaining a task entry corresponding with the task from a task store, where the task entry associates the task with an action and a predicate for performing the action. Instructions further include creating a task object in a task pool using the task entry. Instructions further include receiving an event notification at the task engine, where the event notification is associated with an event. Instructions further include determining whether the predicate for performing the action is satisfied by the event. Instructions further placing the task object in a task queue when the predicate for performing the action is satisfied by the event.

14 Claims, 6 Drawing Sheets

METHOD AND SYSTEM FOR MANAGING A TASK

BACKGROUND

A modern computer system may be conceptually divided into hardware, an operating system, and application programs. The hardware, (i.e., central processing unit (CPU), memory, persistent storage devices, and input/output (I/O) devices) provides the basic computing resources. The application programs (i.e., compilers, database systems, software, and business programs) define the ways in which these resources are used to solve the computing problems of the users. The users may include people, machines, and other computers that use the application programs, which in turn employ the hardware to solve numerous types of problems.

An operating system is a program that acts as an intermediary between the application program layer and the computer hardware. To this end, the operating system is involved in coordinating the efficient and fair use of a finite resource base to enable a broad range of computative tasks (i.e., memory management, hardware resource management, maintaining a file system, processing user-level requests, administrative tasks, networking tasks, etc.). In some instances, when the operating system dispatches an execution thread to perform a particular computative task, the execution thread may execute until the task has completed. Alternatively, in other instances, the operating system may employ a polling scheme, which allows for the computative task to periodically "awaken", execute, and then "sleep" based upon use a pre-determined time interval.

SUMMARY

In general, in one aspect, the invention relates to a computer readable storage medium including executable instructions for managing a task. Executable instructions include instructions to receive a request. Executable instructions further include instructions to determine a task corresponding with the request using a request-to-task mapping. Executable instructions further include instructions to obtain a task entry corresponding with the task from a task store, where the task entry associates the task with an action and a predicate for performing the action. Executable instructions further include instructions to create a task object in a task pool using the task entry, where the task object is one of a plurality of task objects comprised in the task pool. Executable instructions further include instructions to receive an event notification at the task engine, where the event notification is associated with an event. Executable instructions further include instructions to determine whether the predicate for performing the action is satisfied by the event. Executable instructions further include instructions to place the task object in a task queue when the predicate for performing the action is satisfied by the event.

In general, in one aspect, the invention relates to a computer readable storage medium including executable instructions for managing a task. Executable instructions include instructions to receive a first event notification at a task engine, where the first event notification is associated with a first event. Executable instructions further include instructions to determine a task corresponding with the first event using an event-to-task mapping. Executable instructions further include instructions to obtain a task entry corresponding with the task from a task store, where the task entry associates the task with an action and a predicate for performing the action. Executable instructions further include instructions to create a task object in a task pool using the task entry, where the task object is one of a plurality of task objects comprised in the task pool. Executable instructions further include instructions to receive a second event notification at the task engine, where the event notification is associated with a second event. Executable instructions further include instructions to determine whether the predicate for performing the action is satisfied by the second event. Executable instructions further include instructions to place the task object in a task queue when the predicate for performing the action is satisfied by the second event.

In general, in one aspect, the invention relates to a system for managing a task. The system includes a processor. The system further includes an operating system executing on the processor, where the operating system includes a task engine configured to receive a request. The task engine is further configured to determine a task corresponding with the request using a request-to-task mapping. The task engine is further configured to obtain a task entry corresponding with the task from a task store, where the task entry associates the task with an action and a predicate for performing the action. The task engine is further configured to create a task object in a task pool using the task entry. The task engine is further configured to receive a first event notification, where the first event notification is associated with a first event. The task engine is further configured to determine the first event using the first event notification. The task engine is further configured to determine whether the predicate for performing the action is satisfied by the first event. The task engine is further configured to place the task object in a task queue when the predicate for performing the action is satisfied by the first event. The operating system further includes a task store configured to store a task entry. The operating system further includes a task pool configured to store a task object when a predicate for an action associated with the task object has not yet been satisfied. The operating system further includes a task queue configured to store a task object when the predicate for the action has been satisfied. The operating system further includes a dispatcher configured to obtain a task object from a task queue. The dispatcher is further configured to determine an action using a task object. The dispatcher is further configured to determine an execution thread for performing the action. The dispatcher is further configured to dispatch the execution thread for performing the action. The operating system is further configured to create a second event notification for sending to the task engine when the execution thread has completed performing the action, where the completion of the action is a second event associated with the second event notification.

Other aspects of the invention will be apparent from the following description and the appended claims.

DETAILED DESCRIPTION

Figure 1:
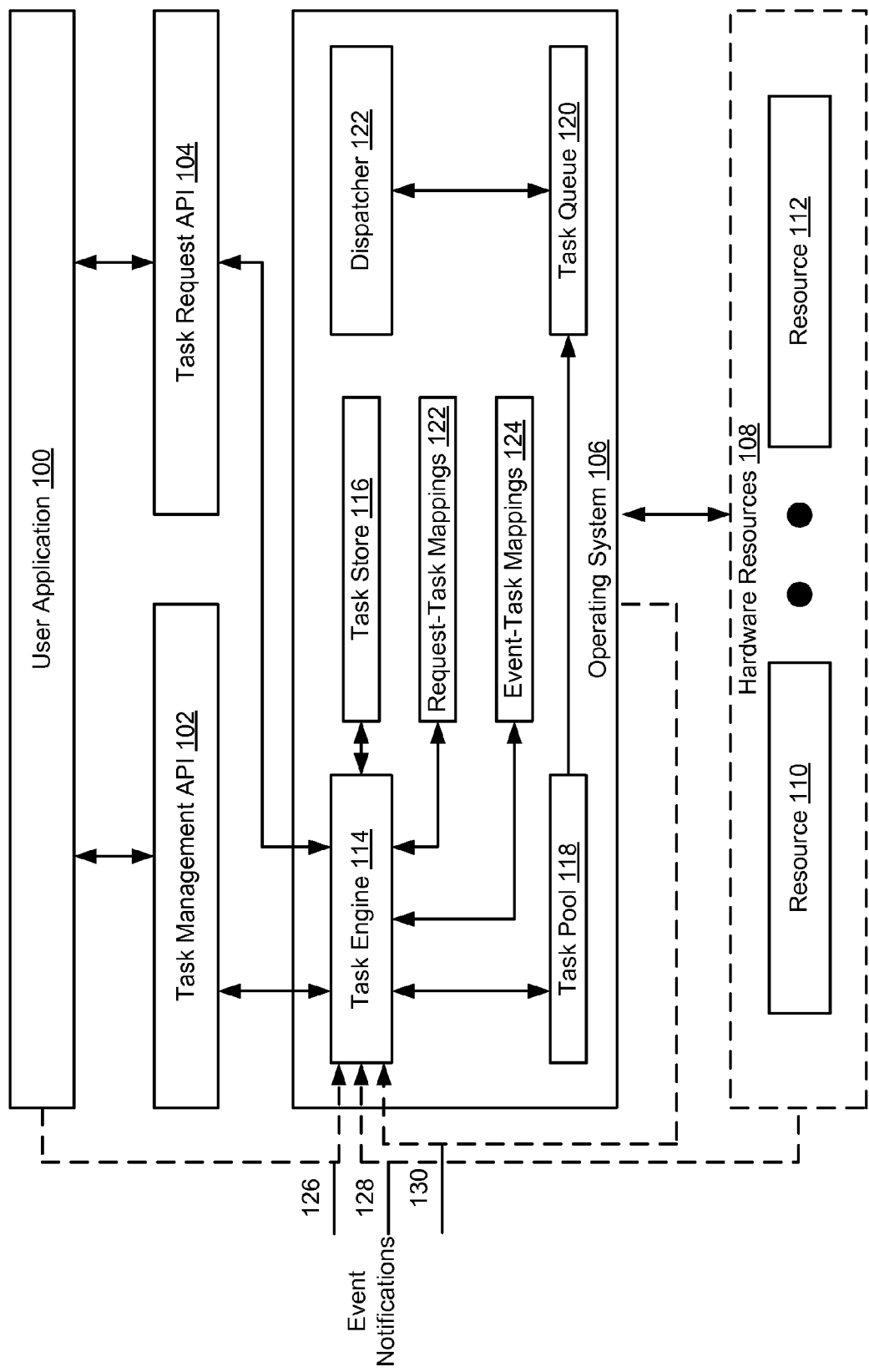
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing a task in an event-driven system. More specifically, embodiments of the invention are directed to managing a task in accordance with a user-provided or pre-defined (i.e., OS-provided or provided by a third-party) description for the task. In one or more embodiments of the invention, a task is a unit of computation performed by an executing thread. Further, a description for a task may provide a discrete action to be performed when the task is executed. In addition, a description for a task may specify a predicate for performing the action. As such, satisfaction of the predicate may serve as a precondition for performance of the action or, said another way, performance of the action depends upon satisfaction of the predicate. In one or more embodiments of the invention, a predicate is an event which may occur. Examples of an event may include, but are not limited to, an action by a user, the completion of a task, the reaching of an operation threshold (e.g., the temperature of processor, the amount of time within a given time interval that a processor is active, the amount of space remaining on a computer readable storage medium, etc.), or any other discrete event (e.g., due to the elapse of a certain duration of time, etc.) that may be described either quantitatively or qualitatively.

FIG. 1 shows a system in accordance with one or more embodiments of the invention. Specifically, FIG. 1 shows (i) a user application (100), (ii) an operating system ("OS") (106), (iii) application programming interfaces (102, 104) that enable a user application (100) to interact with the OS (106), and (iv) hardware resources (108).

User Application

In one or more embodiments of the invention, a user application (100) exists in the software layer of the system with which a user interacts. The user application (100) may be, for example, any application that provides a benefit or attempts to solve a problem and, in doing so, makes use of the system. Examples of user applications may include, for example, a compiler, a database system, a web browser, a web server, a spreadsheet program, a multimedia program, a business program, or any other software. In one or more embodiments of the invention, the user application (100) uses one or more application programming interfaces (i.e., APIs: 102, 104) to issue requests to and receive responses from the OS (106).

Operating System (OS)

In one or more embodiments of the invention, an OS (106) is configured to receive requests and event notifications (126, 128, 130). A request may be issued to the OS (106) by a user application (100) using an API (102, 104). Alternatively, a request may be issued by the OS (106) itself. An event notification (126, 128, 130) is associated with an event that has occurred in relation to the system. As previously described, an event notification (126, 128, 130) may signal an action by a user, the completion of a task, the reaching of an operation threshold, a specified time period elapsing, or any other discrete event that may be described either quantitatively or qualitatively. Upon receipt by the OS (106), a request or event notification is processed using various OS components and defined data structures as shown in FIG. 1: a task engine (114), a task store (116), request-to-task mappings (122), event-to-task mappings (124), a task pool (118), a task queue (120), and a dispatcher (122).

In one or more embodiments of the invention, a task engine (114) is configured to receive and subsequently process a request or event notification. Further, after having processed a request, the task engine (114) is configured to send a response to the request in accordance with one or more embodiments of the invention. More detail as to the processing of a received request or a received event notification is provided in relation to FIGS. 3 and 4, respectively.

In one or more embodiments of the invention, a task store (116) is configured to store a task entry. A task entry specifies an action to be performed and a predicate for performing the action. An example of a task entry defined in accordance with one or more embodiments of the invention is provided in FIG. 2a. In one or more embodiments of the invention, a task entry may be stored in, modified in, or deleted from the task store (116) in accordance to a request issued to the task store by the task engine (114).

In one or more embodiments of the invention, a request-to-task mapping (122) is maintained by the OS (106). Specifically, the request-to-task mapping (122) associates one or more tasks with a request. In one or more embodiments of the invention, the request-to-task mapping (122) is created, maintained, and deleted in accordance with a request received by the task engine (114). For example, a user may issue a request to establish a network connection. As such, tasks related to this request may include: (a) enumeration of one or more network interfacing devices in the system; (b) initializing and associating each network interface device with an appropriate device driver; (c) request by a network configuration utility to configure the network interface parameters (i.e., IP address, subnet mask, default route, wireless network name, etc.); (d) detection by the driver of the network media (i.e., cable, available wireless network, etc.); (e) configuration of the device by the driver of the network interface parameters; (f) request by an application for a communication socket; (g) request by an application to configure the socket for communication with a given remote system; and (h) request by an application to read or write data to or from the remote system using the communication socket.

Further, in one or more embodiments of the invention, the one or more tasks mapped to by a request may have interrelated dependencies. In furtherance of the example provided above, for example, task (h) may depend from task (g), task (g) may depend from task (f), task (f) may depend from task (e), and task (e) may depend from both tasks (b) and (c). In addition, tasks (d) and (c) may both depend from task (b) where task (b) may itself depend from task (a). In addition, in one or more embodiments of the invention, tasks may themselves be broken into further subtasks.

In one embodiment of the invention, the task engine (114) includes functionality to decompose a request at runtime into a series of tasks. The request may be decomposed by determine which of the task (as defined by task entries in the task store) may be used to satisfy the request. Further, the task engine may use both the request-to-task mapping and the functionality to decompose a request at runtime into a series of tasks of the task engine to determine which tasks are required to satisfy the request. Further, in one embodiment of the invention, the task engine may first determine whether there is a request-to-task mapping for the request. If not, the task engine may use functionality to decompose a request at runtime into a series of tasks.

In one or more embodiments of the invention, an event-to-task mapping (124) is maintained by the OS (106). Specifically, the event-to-task mapping (124) associates a task with an event (or type of event). In one or more embodiments of the invention, the event-to-task mapping (124) is created, maintained, and deleted in accordance with a request received by the task engine (114). For example, an event notification may signal that a core of a multi-core processor has reached a specified temperature threshold. As such, tasks related to this event may include: (a) creating a fault management data record to note the temperature violation of the core; (b) consumption of the created fault management data record by a diagnosis and treatment engine and subsequent determination as to whether corrective action is needed; (c) logging of diagnostic information about the temperature violation; and (d) configuring of the core to operate in a thermal throttling mode such that operating temperature is brought into compliance. Similarly, these tasks may be interrelated. For example, (d) may depend from (b) and (b) may depend from (a). Further, (c) may also depend from (a).

In one or more embodiments of the invention, a task pool (118) is configured to store a task object. The task object specifies an action, a predicate for performing the action, and an transaction identifier. In one or more embodiments of the invention, the task object is created and stored in the task pool (118) by task engine (114) using the corresponding task entry.

In one or more embodiments of the invention, a task queue (120) is configured to store a task object (as described above). In one or more embodiments of the invention, the task object is removed from the task pool (118), where it is created, and placed in the task queue (120) when the predicate for performing the action associated with the task is satisfied. In one or more embodiments of the invention, there may be a set of virtualized task queues that may be used to filter task objects according to a task characteristic or any other criteria. For example, task objects in a task queue may be filtered into virtual queues according to transaction identifier.

In one or more embodiments of the invention, the dispatcher (122) is configured to obtain a task object from a task queue (120) (or a virtualized task queue). In addition, the dispatcher is also configured in one or more embodiments of the invention to assign an execution thread to perform the action associated with the task. In one embodiment of the invention, the task queue is implemented as a first-in-first-out (FIFO) queue.

Application Programming Interfaces (API)

In one or more embodiments of the invention, an application programming interface (102, 104) is used to facilitate the sending of requests from the user application (100) to the OS (106). Further, in one or more embodiments of the invention, the OS (106) may provide an API-compliant response to the user application (100).

In one or more embodiments of the invention, a first API (102) is configured to manage (i.e., create, modify, delete, etc.) a task entry maintained by the OS. As such, the first API (102) may be thought of as a Task Management API. For example, requests issued through the Task Management API (102) may manage a task entry in the task store (116), a request-to-task mapping (122), or an event-to-task mapping (124).

In one or more embodiments of the invention, a second API (104) is configured to allow a user of a user-level application (100) to issue requests to the OS (106) resulting in the creation of one or more pending task objects. As such, the second API (104) may be thought of as a Task Request API. For example, requests issued through the Task Request API (104) may be translated into one or more discrete task objects defined by a request-to-task mapping (122).

Hardware Resources

In one or more embodiments of the invention, a hardware resource (110, 112) is utilized according to a request issued by an OS (106). Specifically, a request issued by the OS (106) may require the utilization of the hardware resource (110, 112) pursuant to an action executed by a dispatched execution thread. The hardware resource (110, 112) may be, for example, a memory device (e.g., non-volatile memory, volatile memory, etc.), a processor (single core, multi-core), an I/O device (e.g., a network interface card), a cooling device (e.g., a cooling fan, etc.) or any other hardware device capable of receiving a request from the OS (106).

Figure 2A:
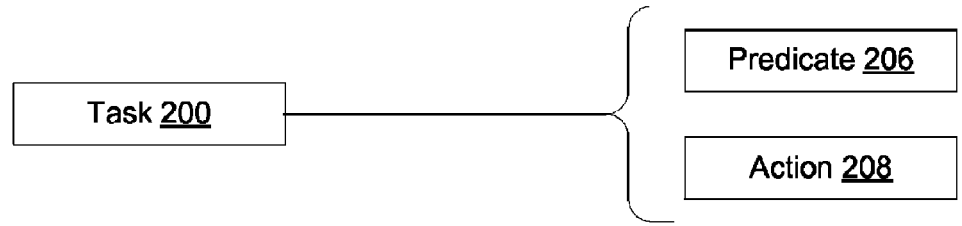
FIGS. 2a and 2b show data structures in accordance with one or more embodiments of the invention.
Figure 2B:
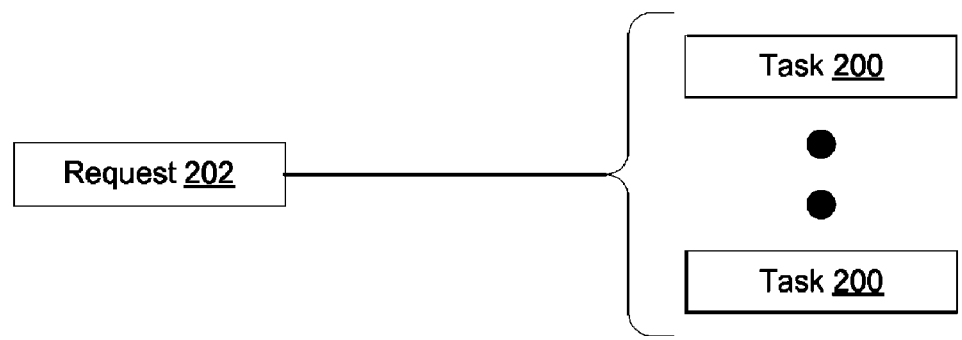
Figure 2B:
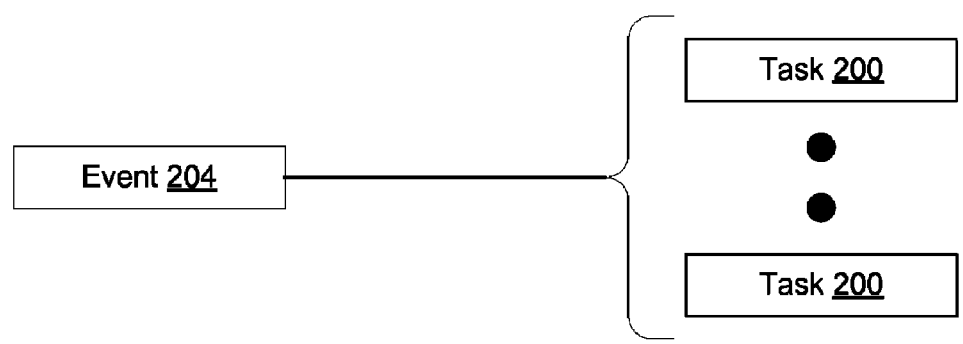

FIGS. 2a and 2b show data structures in accordance with one or more embodiments of the invention.

FIG. 2a shows a data structure used in accordance with one or more embodiments of the invention to define a task object. Specifically, the data structure shown in FIG. 2a may be used to associate an action (208) and a predicate (206) for an action with a task (200). The action (208) associated with the task (200) is performed only when the predicate (206) for the action is satisfied. In one or more embodiments of the invention, the data structure shown in FIG. 2a may be used to define a task entry stored in the task store (as described in relation to FIG. 1). In addition, a task entry may be defined with additional parameters that govern the performance of an action. For example, an action frequency may be defined for a task entry to specify how frequently an action should be performed. In another example, an action priority may be defined for a task entry to specify what priority is associated with the performance of an action.

FIG. 2b shows data structures used in accordance with one or more embodiments of the invention to define task mappings. Specifically, the first data structure shown in FIG. 2b may be used to associate a request (202) with one or more tasks (200). Further, the second data structure shown in FIG. 2b may be used to associate an event (204) with one or more tasks (200). In one or more embodiments of the invention, the first data structure may be used to define the request-to-task mapping and the second data structure may be used to define the event-to-task mapping as described in relation to FIG. 1.

Figure 3:
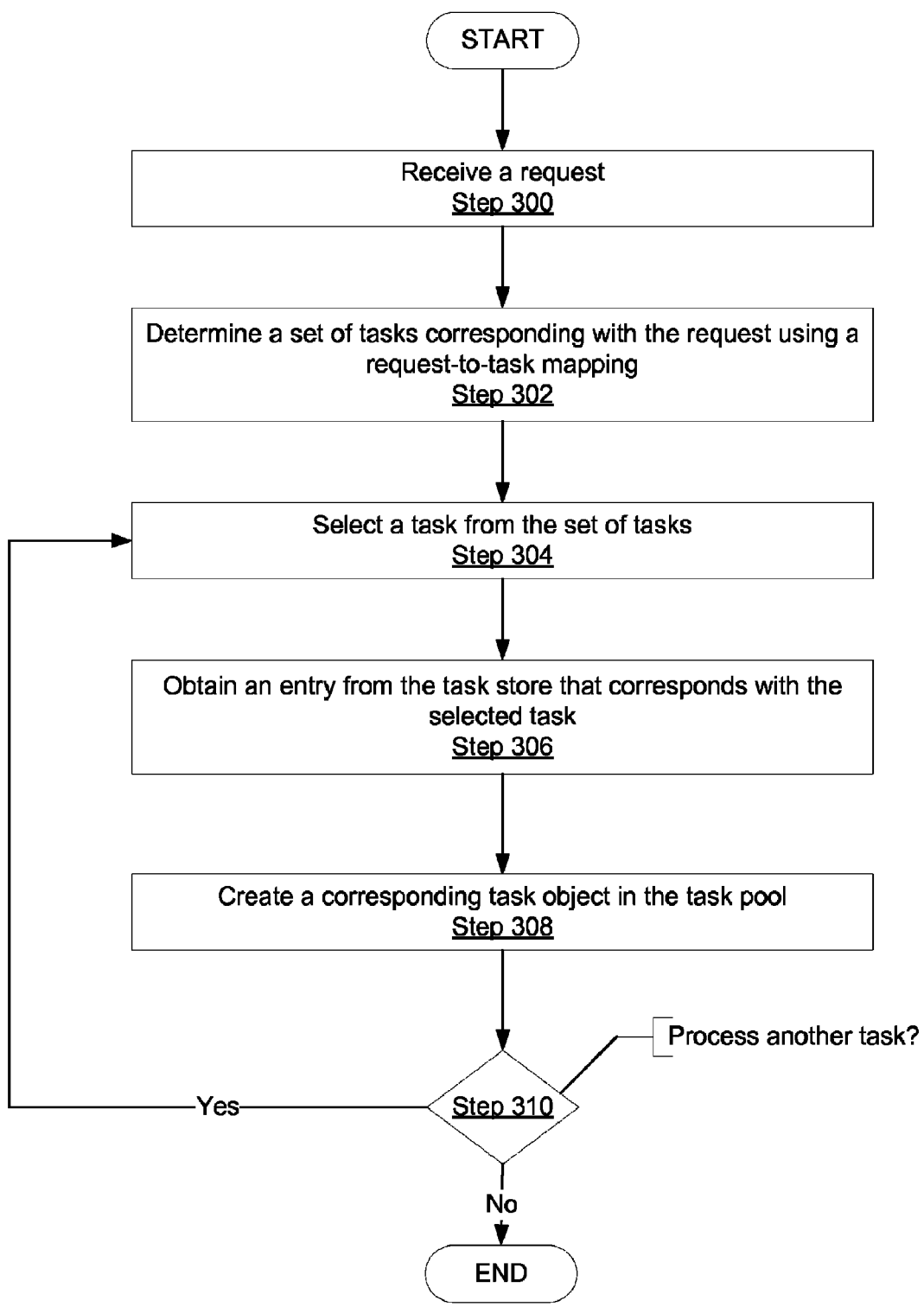
FIGS. 3, 4, and 5 show flowcharts in accordance with one or more embodiments of the invention.
Figure 4:
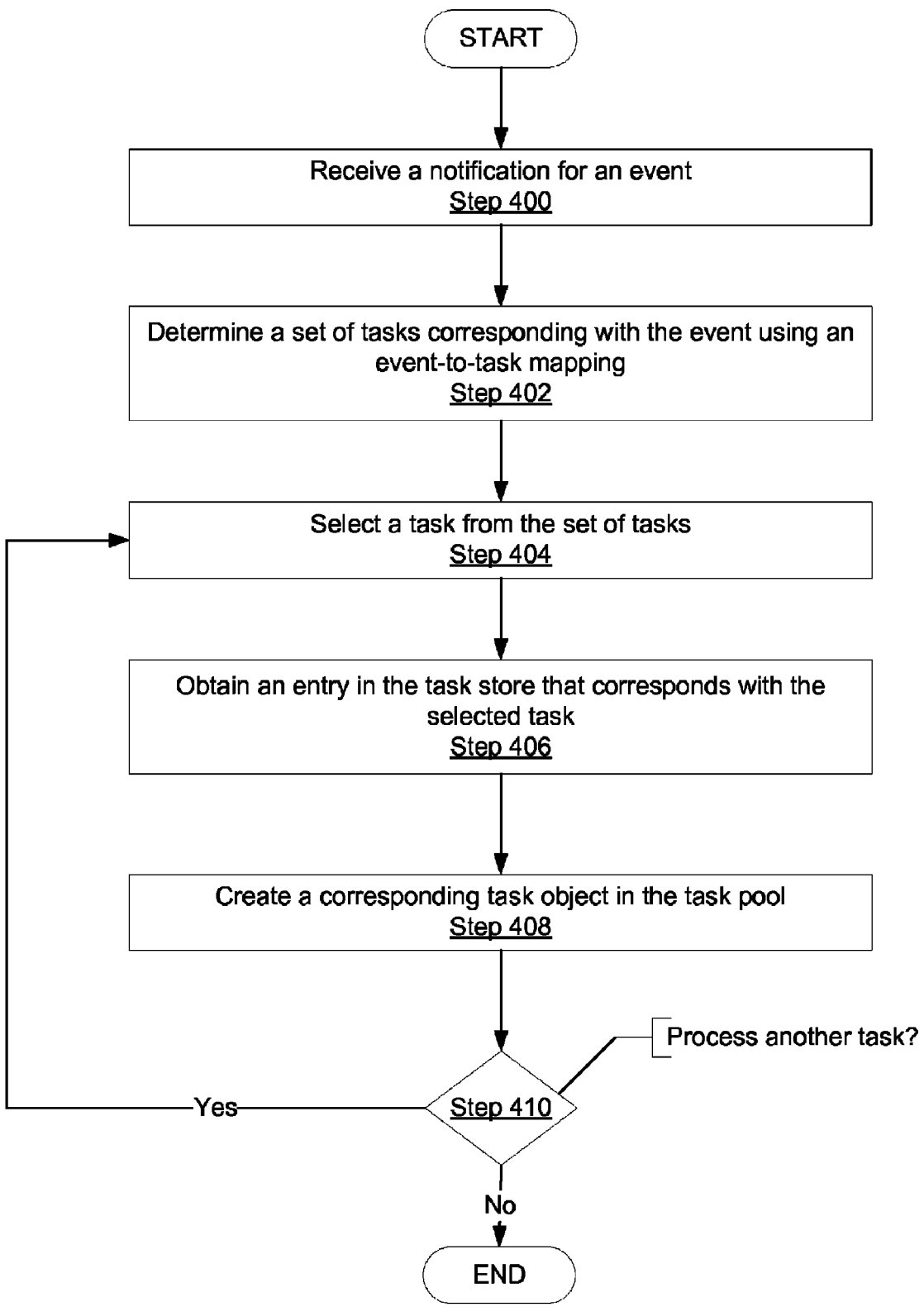
Figure 5:
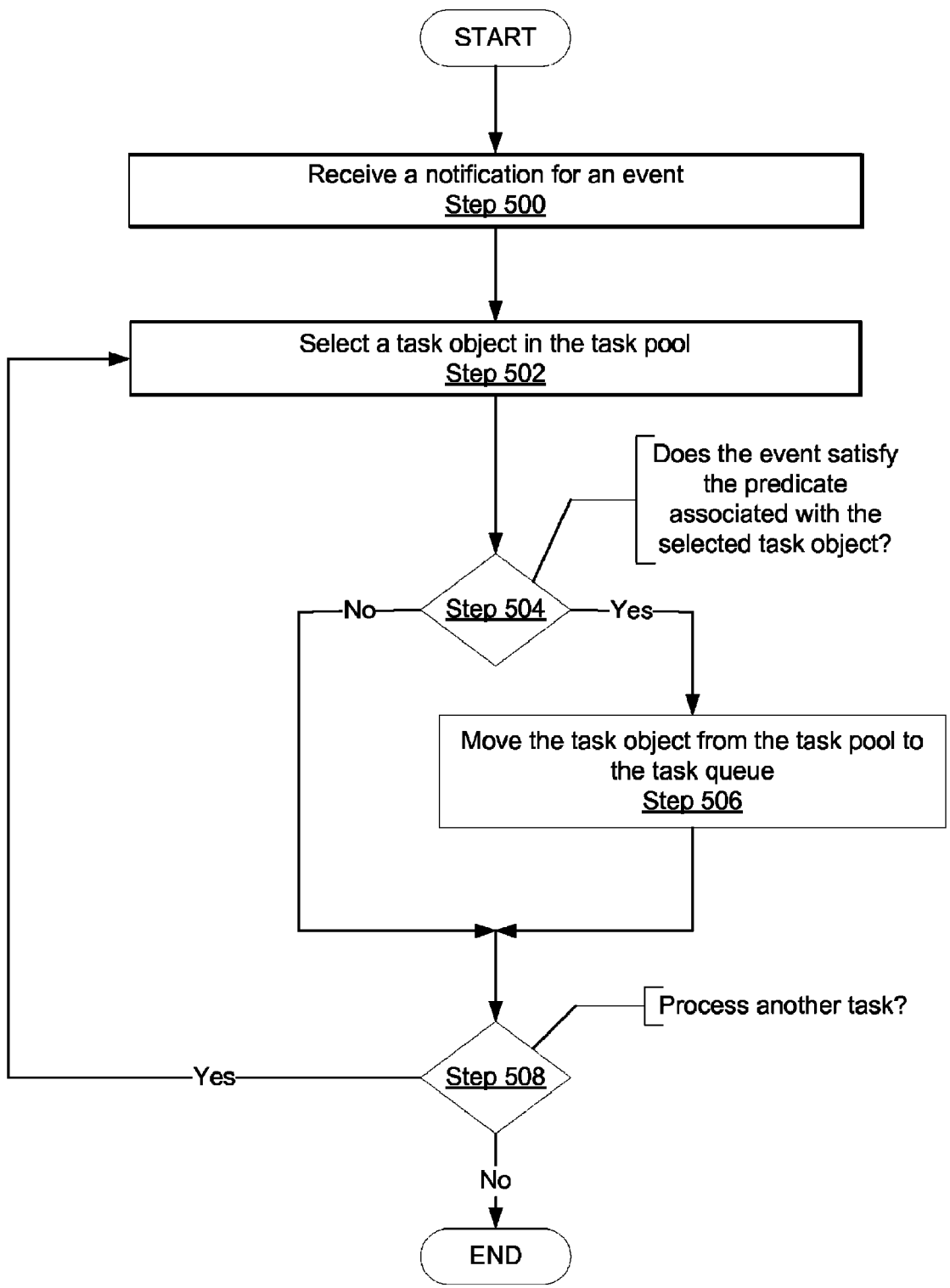

FIGS. 3, 4, and 5 show flowcharts in accordance with one or more embodiments of the invention. While the various steps in these flowcharts are presented and described sequentially, one should appreciate that some or all of the steps may be executed in different orders, may be combined or omitted, and some or all of the steps may be executed in parallel. In addition, steps have been omitted to simplify the presentation.

Turning to FIG. 3, the process shown therein may be used, for example, to process a request received by a task engine. In Step 300, a request is received. In one or more embodiments of the invention, the task engine assigns a unique transaction identifier to the request (i.e., not shown in FIG. 3).

In Step 302, a set of tasks corresponding with the request is determined using a request-to-task mapping. In one or more embodiments of the invention, the task engine uses the received request to select the appropriate request-to-task mapping. In one or more embodiments of the invention, this mapping is defined in accordance with the first data structure shown in FIG. 2b. Having selected the appropriate mapping, the task engine may then determine which tasks properly correspond with the request that was received. In one or more embodiments of the invention, Steps 304-308 (i.e., described below) may function as an iterative loop to process each one of the tasks in the set of tasks.

In Step 304, a task is selected from the set of tasks. In Step 306, the selected task is then used to obtain a corresponding task entry from the task store. In one or more embodiments of the invention, the task entry is defined as shown in FIG. 2a. Accordingly, obtaining a task entry allows the task engine to determine an action associated with the task and a predicate for performing the action.

In Step 308, the obtained task entry is used to create a task object, which is subsequently stored in a task pool. In one or more embodiments of the invention, the task object is associated with the same action and predicate as defined by the obtained task entry. Further, in one or more embodiments of the invention, the task object is further associated with an transaction identifier unique to the request (if assigned by the task engine in or after Step 300).

In Step 310, a determination is made as to whether another task from the set of tasks (i.e., from Step 302) requires processing (i.e., Steps 304-308). If another task from the set of tasks requires processing, then Step 304 is executed next with regards to a newly-selected task. Otherwise, if all tasks from the set of tasks have been processed, the process shown in FIG. 3 is completed for the received request.

Turning to FIG. 4, the process shown therein may be used, for example, to process an event notification received by a task engine. In Step 400, an event notification is received. In one or more embodiments of the invention, the task engine assigns a unique transaction identifier to the event notification (i.e., step not shown in FIG. 4).

In Step 402, a set of tasks corresponding with the event notification is determined using an event-to-task mapping. In one or more embodiments of the invention, the task engine uses the event from the event notification to select the appropriate event-to-task mapping. In one or more embodiments of the invention, this mapping is defined in accordance with the second data structure shown in FIG. 2b. Having selected the appropriate mapping, the task engine may then determine which tasks properly correspond with the received event notification. In one or more embodiments of the invention, Steps 404-408 (i.e., described below) may function as an iterative loop to process each one of the tasks in the set of tasks.

In Step 404, a task is selected from the set of tasks. In Step 406, the selected task is then used to obtain a corresponding task entry from the task store. In one or more embodiments of the invention, the task entry is defined as shown in FIG. 2a. Accordingly, obtaining a task entry allows the task engine to determine an action associated with the task and a predicate for performing the action.

In Step 408, the obtained task entry is used to create and store a task object in a task pool. In one or more embodiments of the invention, the task object is associated with the same action and predicate as defined by the obtained task entry. Further, in one or more embodiments of the invention, the task object is further associated with a transaction identifier unique to the event (if assigned by the task engine in or after Step 400).

In Step 410, a determination is made as to whether another task from the set of tasks (i.e., from Step 402) requires processing (i.e., Steps 404-408). If another task from the set of tasks requires processing, then Step 404 is executed next with regards to a newly-selected task. Otherwise, if all tasks from the set of tasks have been processed, the process shown in FIG. 4 is completed for the received event.

Turning to FIG. 5, the process shown therein may be used, for example, to process a pending task in a task pool when the predicate for an action associated with the pending task has been satisfied.

In Step 500, an event notification is received. In one or more embodiments of the invention, the task engine assigns a unique transaction identifier to the event notification (i.e., step not shown in FIG. 5). In one or more embodiments of the invention, Steps 502-508 (i.e., described below) may function as an iterative loop to process each one of the task objects in the task pool.

In Step 502, a task object is selected from the task pool. In one or more embodiments of the invention, the task object is associated with an action and a predicate for performing the action. In Step 504, a determination is made as to whether the predicate for the action associated with the selected task object is satisfied by the event (i.e., from the event notification received in Step 500). If the predicate for the action is satisfied by the event, then Step 506 is executed next. Otherwise, if the predicate for the action is not satisfied by the event, Step 508 is executed.

In one or more embodiments of the invention, the determination of Step 504 is contextual in that the operational context of the event (i.e., received in Step 500) and the operational context of the selected task object (i.e., selected in Step 502) must match for the task object predicate to be satisfied. More specifically, transaction identifiers, as stored in each task object and as assigned by the task engine for each received request or event notification, are used to determine whether there is a match. In one embodiment of the invention, the use of transaction identifiers enables multiple task objects derived from the same task entry to contemporaneously exist in the storage pool and allow the appropriate events to satisfy the appropriate predicates.

In Step 506, the selected task object is removed from the task pool and placed in the task queue. In Step 508, a determination is made as to whether another task object from the task pool requires processing (i.e., Steps 502-508). If another task object from the task pool requires processing, then Step 502 is executed next with regards to a newly-selected task object. Otherwise, if all the task objects in the task pool have been processed, the process shown in FIG. 5 is complete.

In one embodiment of the invention, the predicates for the task objects are analyzed prior to the task objects being stored in the task pool or at some initial point after the task objects are in the task pool. During the aforementioned analysis, if the predicates are satisfied, e.g., because the predicate indicates that the task is to be automatically transferred to the task queue, then the task object is sent to task queue. In such cases, the task object may be forwarded to the task queue even though an event notification was not received.

EXAMPLE

The following scenario presents an example in accordance with one or more embodiments of the invention. The example is not intended to limit the scope of the invention. For purposes of the example, assume a user is sitting in a wireless Internet café with a laptop computer that is equipped with a wireless network card. Further assume that the user wishes to spend some time browsing web pages on the Internet. As such, the user's laptop computer must first connect to the Internet. To this end, the user runs a user-level software application on the laptop computer which allows the user to issue a request for connecting to the Internet (or more specifically a wireless network in the Internet café). Accordingly, the aforementioned software application receives a first request for connecting to the Internet from the user. In processing the first request from the user, the software application invokes a specific function in the Task Request API for connecting to the Internet.

As a result of the user-level software application invoking the Task Request API function, the task engine in the OS of the laptop computer receives a request. Accordingly, the task engine assigns a unique transaction identifier for the request. Further, the task engine determines a set of tasks using a request-to-task mapping maintained by the OS. In particular, the request-to-task mapping corresponds with the request for connecting to the Internet received by the task engine and, as such, specifies a set of mapped-to tasks that are necessary for Internet connectivity.

For example, a first task may be the detection of a wireless network card. As such, the first task may be said to depend upon, for example, the selection and loading of the OS. In addition, a second task may be the enabling of the radio on the wireless network card and, as such, may be said to depend upon the detection of a wireless network card (i.e., completion of the first task). Further, a third task may be the detection of one or more wireless networks. Accordingly, the third task may be said to depend upon the enabling of the radio on the wireless network card (i.e., completion of the second task). A fourth task may be the selection of and connection to a wireless network, which would depend upon the detection of a wireless network (i.e., completion of the third task).

In view of this, a request by a user may be mapped to a number of discrete tasks in accordance with one or more embodiments of the invention. Further, there may be an implied dependency among the mapped-to tasks as described above. A symbolic description of actions for the aforementioned tasks and their corresponding necessary predicates is provided below.

"Connect to Internet" Tasks

Task #1: if (O/S is initialized)→action: detect a wireless network card
Task #2: if (completion of Task #1)→action: enable a radio for the wireless network card
Task #3: if (completion of Task #2)→action: detect a wireless network
Task #4: if (completion of Task #3)→action: connect to wireless network Returning to the example, a task object is created in the task pool in correspondence to each of the mapped-to tasks determined by the task engine. Specifically, each task object will be associated with an action to be performed, a predicate for performing the action, and the transaction identifier. Accordingly, with the receipt of an event notification, the task engine will iterate through each of the task objects in the task pool to determine whether a task predicate for a task object has been satisfied by the event.

In this particular example, the OS for the laptop computer has already been initialized. As such, the predicate for the first task is already satisfied. Accordingly, a dispatcher in the OS will obtain the task object corresponding with the first task and subsequently dispatch an execution thread to perform the action in the corresponding task object. Specifically, in performing the action associated with the obtained task object, the execution thread detects a wireless network card. Once a wireless network card has been detected, an event notification is created to memorialize the event. The event notification may also include the transaction identifier associated with the executed task. Once created, the event notification is sent to the task engine for purposes of providing a notification that a wireless network card has been detected. The task engine, having then received the event notification, searches the remaining task objects in the task pool to determine whether any of the action predicates embodied in the task objects are now satisfied in light of the received event (i.e., detection of a wireless network card). In the context of this particular example, the task engine determines that the detection of a wireless network card satisfies the predicate for enabling the radio on the wireless network card.

The example above is but a specific example of how task objects in a task pool may be processed in light of an event notification (i.e., the completion of an action in the example but, more generally, any event suffices) to result in the performance of an action. Further, the performance of that particular action may itself satisfy the predicate for a next action as described above.

In addition, the assignment of a transaction identifier may be used by the task engine to provide not only an operational context within the system for tasks and events. For instance, in the example above, a unique transaction identifier is issued when the task engine received the 'connect to the internet' request from the user-level software application. Accordingly, all mapped-to tasks determined by the task engine to be associated with the request are instantiated as task objects with the like transaction identifier. Further, when a task object is executed, an event notification is created using the same transaction identifier for sending to the task engine. As such, the task engine, when it receives the event notification, is able to use the transaction identifier to determine whether a task object in the task pool is operative in the same operational context within the system.

Embodiments of the invention may allow for more efficient use of resources in a system. Specifically, embodiments of the invention allow developers and users of a system to more precisely relate a task or set of tasks to an action, operation, or circumstance elsewhere in the system (i.e., predicates). Embodiments of the invention allow for tasks to be related to events such that a task may be, for example, performed or performed more/less frequently based on the occurrence of a specified event. Accordingly, costs associated with polling are reduced because polling may be executed at a bare minimum until a specified predicate is satisfied. Alternatively, a predicate for a task may be specified as a function of elapsed time rather than the occurrence of a discrete event. Accordingly, in enabling the expression of task predicates as described with respect to the invention allow for greater flexibility and latitude with regards to the scheduling of tasks.

Figure 6:
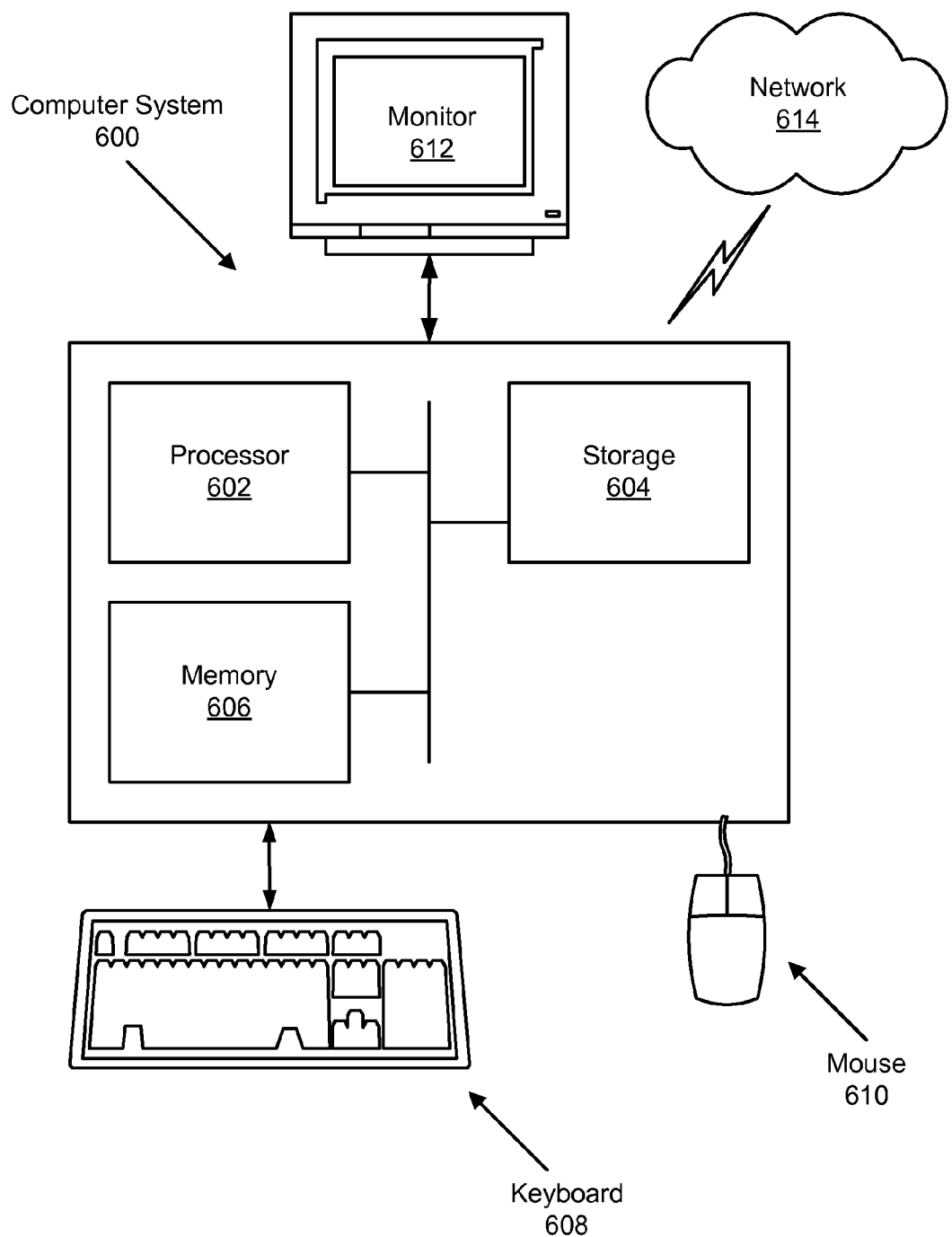
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more processors (602), associated memory (606) (e.g., random access memory (RAM), cache memory, flash memory, etc.), a storage device (604) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable storage medium comprising executable instructions for managing a task, wherein executable instructions comprise instructions to:
   receive a request at a task engine;
   determine a first task corresponding with the request using a first request-to-task mapping;
   obtain a first task entry corresponding with the first task from a task store, wherein the first task entry associates the first task with a first action and a first predicate for performing the first action;
   create a first task object in a task pool using the first task entry, wherein the first task object is one of a plurality of task objects comprised in the task pool;
   receive a first event notification at the task engine, wherein the first event notification is associated with a first event;
   determine whether the first predicate for performing the first action is satisfied by the first event;
   place the first task object in a task queue when the first predicate for performing the first action is satisfied by the first event;
   obtain the first task object using a dispatcher from the task queue;
   determine the first action using the first task object;
   determine a first execution thread to perform the first action;
   perform the first action using the first execution thread;
   create a second event notification when the first execution thread has completed performing the first action, wherein the second event notification is associated with a second event indicating the completion of the first action, and
   send the second event notification to the task engine.

2. The non-transitory computer readable storage medium of claim 1, wherein executable instructions further comprise instructions to:
   determine a second task corresponding with the request using a second request-to-task mapping;
   obtain a second task entry corresponding with the second task from the task store, wherein the second task entry associates the second task with a second action and a second predicate for performing the second action; and
   create a second task object in the task pool using the second task entry, wherein the second task object is one of the plurality of task objects.

3. The non-transitory computer readable storage medium of claim 1, wherein executable instructions further comprise instructions to:
   receive the second event notification at the task engine, wherein the second event notification is associated with the second event;
   determine whether a second predicate for performing a second action is satisfied by the second event; and
   place a second task object in the task queue when the second predicate for performing the second action is satisfied by the second event.

4. The non-transitory computer readable storage medium of claim 2, wherein executable instructions further comprise instructions to:
   receive the second event notification at the task engine, wherein the second event notification is associated with the second event;
   determine whether a third predicate for performing a third action is satisfied by the second event, wherein a third task object is associated with the third action, the third predicate for performing the third action, wherein the third task object is comprised in the plurality of task objects comprised in the task pool; and
   place the third task object in the task queue when the third predicate for performing the third action is satisfied by the second event.

5. The non-transitory computer readable storage medium of claim 1, wherein the request is one selected from a group consisting of a request generated by a user-level application, a request generated by an operating system, and a request generated by a hardware resource.

6. A non-transitory computer readable storage medium comprising executable instructions for managing a task, wherein executable instructions comprise instructions to:
   receive a first event notification at a task engine, wherein the first event notification is associated with a first event;
   determine a first task corresponding with the first event using a first event-to-task mapping;
   obtain a first task entry corresponding with the first task from a task store, wherein the first task entry associates the first task with a first action and a first predicate for performing the first action;
   create a first task object in a task pool using the first task entry, wherein the first task object is one of a plurality of task objects comprised in the task pool;
   receive a second event notification at the task engine, wherein the second event notification is associated with a second event;
   determine whether the first predicate for performing the first action is satisfied by the second event;
   place the first task object in a task queue when the first predicate for performing the first action is satisfied by the second event;
   obtain the first task object using a dispatcher from the task queue;
   determine the first action using the first task object;
   determine a first execution thread to perform the first action;
   perform the first action using the first execution thread;
   create a third event notification when the first execution thread has completed performing the first action, wherein the third event notification is associated with a third event comprising the completion of the first action; and send the third event notification to the task engine.

7. The non-transitory computer readable storage medium of claim 6, wherein executable instructions further comprise instructions to:

determine a second task corresponding with the first event using a second event-to-task mapping;

obtain a second task entry corresponding with the second task from the task store, wherein the second task entry associates the second task with a second action and a second predicate for performing the second action; and create a second task object in the task pool using the second task entry, wherein the second task object is one of the plurality of task objects.

8. The non-transitory computer readable medium of claim 6, wherein executable instructions further comprise instructions to:

receive the third event notification at the task engine, wherein the third event notification is associated with the third event;

determine whether a second predicate for performing a second action is satisfied by the third event; and place a second task object in the task queue when the second predicate for performing the second action is satisfied by the third event.

9. The non-transitory computer readable medium of claim 8, wherein executable instructions further comprise instructions to:

receive the third event notification at the task engine, wherein the third event notification is associated with the third event;

determine the third event using the third event notification;

determine whether a third predicate for performing a third action is satisfied by the third event, wherein a third task object is associated with the third action, the third predicate for performing the third action wherein the third task object is comprised in the plurality of task objects comprised in the task pool; and place the third task object in the task queue when the third predicate for performing the third action is satisfied by the third event.

10. A system for managing a task, comprising:

a processor;

an operating system executing on, wherein the operating system comprises:

a task engine, configured to:

receive a request;

determine a first task corresponding with the request using a request-to-task mapping;

obtain a first task entry corresponding with the first task from a task store, wherein the first task entry associates the first task with a first action and a first predicate for performing the first action;

create a first task object in a task pool using the first task entry;

receive a first event notification, wherein the first event notification is associated with a first event;

determine the first event using the first event notification;

determine whether the first predicate for performing the first action is satisfied by the first event;

place the first task object in a task queue when the first predicate for performing the first action is satisfied by the first event;

the task store, configured to:

store the first task entry;

the task pool, configured to:

store the first task object when the first predicate for the first action has not yet been satisfied;

the task queue, configured to:

store the first task object when the first predicate for the first action has been satisfied;

a dispatcher, configured to:

obtain the first task object from the task queue;

determine the first action using the first task object;

determine a first execution thread for performing the first action; and dispatch the first execution thread for performing the first action;

wherein the operating system is configured to create a second event notification for sending to the task engine when the first execution thread has completed performing the first action, and wherein the completion of the first action is a second event associated with the second event notification.

11. The system of claim 10, wherein the task engine is further configured to:

receive a third event notification, wherein the third event notification is associated with a third event;

determine a second task corresponding with the third event using an event-to-task mapping;

obtain a second task entry corresponding with the second task from the task store, wherein the second task entry associates the second task with a second action and a second predicate for performing the second action;

create a second task object in the task pool using the second task entry, wherein the second task object is associated with the second action, the second predicate;

receive a fourth event notification, wherein the fourth event notification is associated with a fourth event;

determine the fourth event using the fourth event notification;

determine whether the second predicate for performing the second action is satisfied by the fourth event; and place the second task object in the task queue when the second predicate for performing the second action is satisfied by the fourth event;

the task store is further configured to:

store the second task entry;

the task pool is further configured to:

store the second task object when the second predicate for the second action has not yet been satisfied;

the task queue is further configured to:

store the second task object when the second predicate for the second action has been satisfied;

the dispatcher, further configured to:

obtain the second task object from the task queue;

determine the second action using the second task object;

determine a second execution thread for performing the second action; and dispatch the second execution thread for performing the second action;

wherein the operating system is configured to create a fifth event notification for sending to the task engine when the second execution thread has completed performing the second action, and wherein the completion of the second action is a fifth event associated with the fifth event notification.

12. The system of claim 10, wherein the request is one selected from a group consisting of a request generated by a user-level application, a request generated by the operating system, and a request generated by a hardware resource.

13. The system of claim 12, wherein the request generated by a user-level application is sent using a first application program interface (API).

14. The system of claim 10, wherein a second API is used to:

create the first task entry in the task store;
create the second task entry in the task store;
create the request-to-task mapping; and
create the event-to-task mapping.

* * * * *